Jan. 11, 1955   L. REPSHER ET AL   2,699,417
PAPER-COVERED ALUMINUM ASSEMBLY FOR BONDING TO PLYWOOD
Filed May 6, 1949
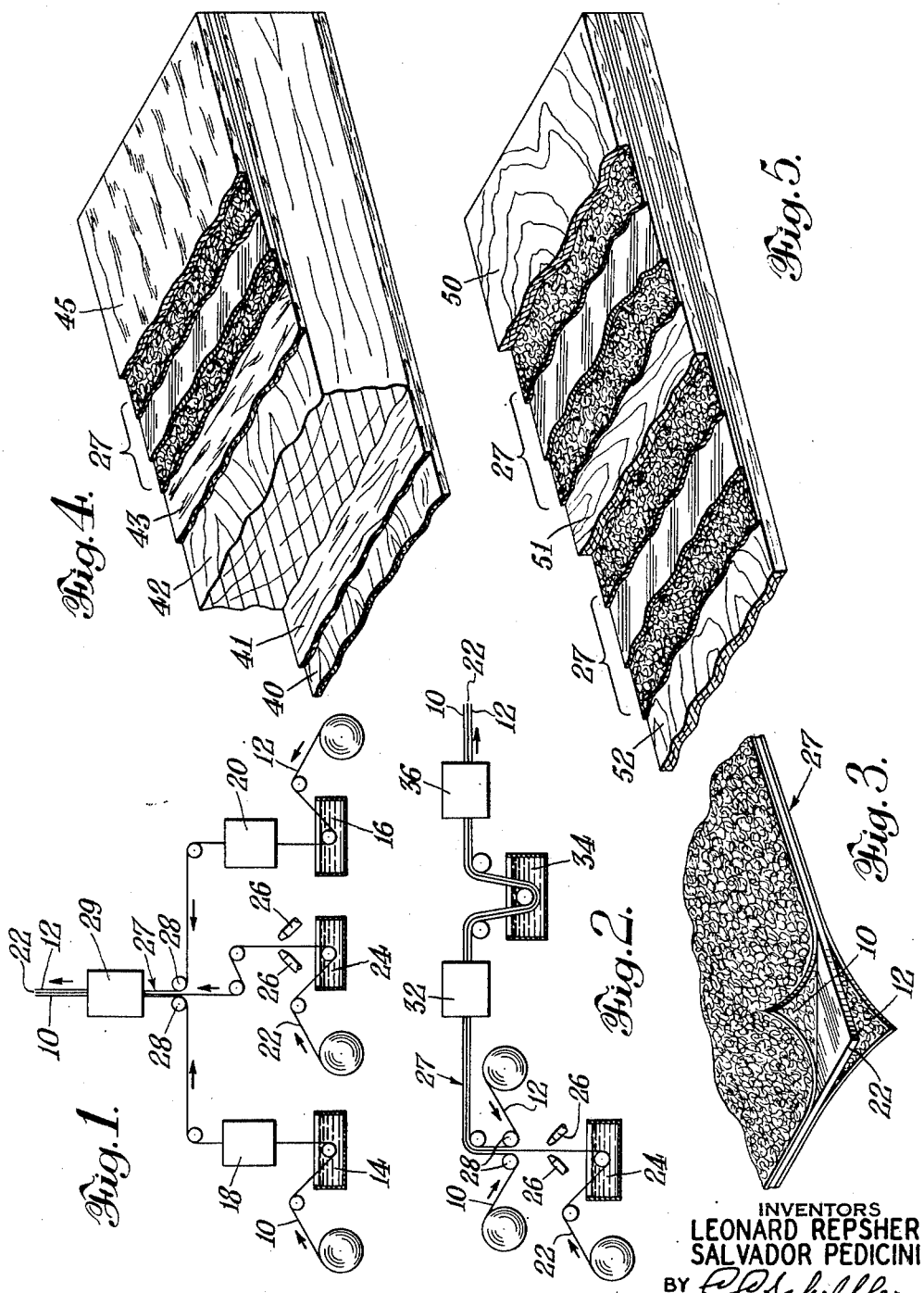
INVENTORS
LEONARD REPSHER
SALVADOR PEDICINI
BY *C. Scheffler*
ATTORNEY 2,699,417

PAPER-COVERED ALUMINUM ASSEMBLY FOR BONDING TO PLYWOOD

Leonard Repsher, Caldwell, and Salvador Pedicini, Newark, N. J., assignors, by mesne assignments, to Union Carbide and Carbon Corporation, a corporation of New York Application May 6, 1949, Serial No. 91,712

9 Claims. (Cl. 154—129)

This invention relates to improvements in laminated structures comprising several plies of cellulosic fibrous sheet materials, and one or more plies of sheet aluminum intimately bonded together by improved thermosetting phenolformaldehyde resins.

More particularly the invention is concerned with improvements in laminated structures wherein wood plies are the principal fibrous material, and the aluminum sheet functions as an impermeable barrier preventing the transmission of water in liquid or vapor form through the structure. Additionally, the aluminum sheet, when suitably positioned near a heat-resistant varnish coated top surface of the laminated structure can also serve as a heat dissipating medium to prevent charring of the varnished surface by hot articles in contact therewith, such as burning cigarettes, chafing dishes, casseroles and the like.

Heretofore, it was known that strong joints between fibrous matter such as wood to wood, paper to paper, or paper to wood could be readily obtained with conventional thermosetting phenol-formaldehyde resins. The high strength of such joints, whereby failure occurred predominantly in the fibrous material and not at the resin interface or glue line, is the resultant of combined mechanical adhesion and specific adhesion effects. In the resin bonding of metal surfaces which are generally smooth and non porous, there is little or no mechanical adhesion; and the bond strength is largely dependent upon the specific adhesion of the resin to the metal surfaces.

Of the metals, aluminum is particularly troublesome with regard to obtaining good bond strengths with thermosetting phenol-formaldehyde resins. Hitherto it has been considered essential to acid etch or anodize the aluminum surface to clean and prepare the surfaces for satisfactory adhesion thereto by phenolic resin. These treatments are time-consuming, expensive and in the instance of acid etching involve considerable consumption of aluminum amounting to as much as one-third of the metal in sheets of foil thickness.

A further complication in pressure bonding sheet metal to fibrous cellulosic sheet material, is that during the initial stage of heat-curing the resinous binder, the resin softens and is more or less liquid for some time before curing to infusibility. The liquefied resin being subjected to pressure flows readily into the structure of the fibrous sheet material. Such migration of the resin causes an insufficient amount of resin to remain at the interface of the metal sheet and the fibrous material, thereby yielding a weak bond or joint.

Another problem encountered in thermosetting resin bonded structures of cellulosic fibrous matter and sheet metal is that of unequal coefficients of expansions of these materials when subjected to varying thermal and humidity conditions. For example, when a composite structure of this type is exposed to moderate heat, the fibrous matter tends to shrink because of dehydration effects, whereas the metal portion expands. Alternatively when the structure is held at normal temperature but in a humid atmosphere, the fibrous matter tends to swell by absorption of water vapor, while the metal portion remains dimensionally constant. These dimensional conflicts cause the resin bond to be highly strained, diminishing its ultimate strength and leading to early destruction of the bond.

The improvements contemplated by the present invention with respect to composite aluminum and fibrous structures include the use of thermosetting phenol-formaldehyde resins having superior specific adhesion to aluminum surfaces and minimum flow into the fibrous elements during the heat and pressure bonding operation, employment of a paper barrier to further retard resin flow, and novel procedure for rapid and economical manufacture of the improved composite laminated structures.

One of the features upon which the present invention depends is the employment of fusible thermosetting phenol-formaldehyde resins which have been reacted to almost the "B" stage while dissolved in an alcohol such as ethyl alcohol. Thermosetting resins thus prepared adhere well not only to acid etched or anodized aluminum surface, but surprisingly have excellent adherence to aluminum surfaces which have been cleaned merely by an economical washing in an aqueous solution of trisodium phosphate. Another desirable property of the alcohol reacted phenol-formaldehyde resins is the decreased flow on heat-curing in comparison with the greater flow of conventional phenol-formaldehyde resins hitherto employed for molding or laminating purposes. The decreased flow of the alcohol reacted resins is attributed jointly to their higher molecular weight and their rapid rate of heat-conversion reducing to a minimum the time period during which the resin is in a flowable condition.

Additional control of resin flow in the heat and pressure bonding operation as well as higher bond strengths are obtained by applying paper sheets saturated with the improved thermosetting resin as immediately adjacent plies to one or both faces of the aluminum sheet. Surprisingly, thinner paper sheets, for example of tissue weight, have been found to yield composite laminated structures of higher bond strength than heavier papers such as 30 pounds per ream Southern Kraft paper.

A sub-assembly consisting of an aluminum sheet, and in adherent relationship to each face thereof a paper sheet impregnated with the alcohol reacted thermosetting resins disclosed herein, has been found to contain sufficient resin for direct bonding to non-resin coated or non-resin impregnated paper or wood plies. These sub-assemblies have been satisfactorily heat and pressure bonded to the normally rough finish Douglas fir veneers, producing aluminum sheet containing plywoods having a bond quality after repeated exposures to moisture and then drying, meeting the test requirements established for exterior grade plywood by the Douglas Fir Plywood Association. The sub-assemblies also overcome the handling difficulties such as tearing, wrinkling and distortion common to the use of bare aluminum of foil thickness.

In the drawing, illustrating diagrammatically the manufacture of the sub-assembly of sheet aluminum and adherent resin impregnated paper, and laminated structures bonded by means of the sub-assembly:

Fig. 1 is a diagrammatic illustration of an apparatus for individually coating sheet aluminum and two paper sheets with resin solution, means for partially drying the coated aluminum and paper sheets, means for pressing the partially dried paper sheets onto each face of the aluminum sheet to form the sub-assembly, and means for further drying the sub-assembly;

Fig. 2 is a diagrammatic illustration of an alternate method for making the sub-assembly by first coating the sheet aluminum surface with resin solution, means for partially drying the resin coated aluminum sheet to a tacky condition by air blasted thereon, means for pressing paper sheets onto the tacky resin surface, means for drying the assembly thus made, means for recoating the assembly with more resin, and means for drying the recoated assembly;

Fig. 3 represents a perspective view of a sub-assembly consisting of sheet aluminum bonded on each side with resin impregnated paper;

Fig. 4 is a perspective view of a plywood laminate having a paper covered aluminum sheet sub-assembly adjacent to a face veneer for imparting heat-resistance;

Fig. 5 is a perspective view of a Douglas fir plywood construction containing two sub-assemblies of aluminum foil as moisture barriers.

The procedure illustrated in Fig. 1 comprises impregnating each of the paper sheets 10 and 12 with a solution of the herein disclosed alcohol reacted phenol-formaldehyde resins by passing the paper sheets 10 and 12 into and out of the resin solution containing tanks 14 and 16 respectively. The impregnated paper sheets 10 and 12 are then passed through heated drying chambers 18 and 20 to evaporate off most of the solvent. The drying chamber temperatures are maintained below the heat-curing temperature of the resin. About 40° C. to 70° C. has been found a satisfactory temperature in the drying chambers 18 and 20 where the resin solvent is principally ethyl or isopropyl alcohol. Simultaneously aluminum foil 22 is also coated with the same resin solution by being dipped into a tank 24. The resin coated aluminum sheet 22 is partially dried, as by air blowing thereon from nozzles 26, until the coating is in a tacky state. Each face of the resin coated aluminum sheet 22 is then covered with resin impregnated paper sheets 10 and 12 and this sub-assembly 27 is then pressed together by nip rolls 28. The sub-assembly 27 is next dried in its passage through a drying chamber 29, similarly controlled in temperature as the paper drying chambers 18 and 20. After emerging from the drying chamber 29, the sub-assembly 27 is ready for immediate use as a bonding element in plywood construction, or it can be stored safely at room temperatures (25° C.) for several months before being used.

In the method illustrated in Fig. 2 for forming a resin containing sub-assembly of sheet aluminum and paper, the sheet aluminum 22 is dipped into a solution of the alcohol reacted phenol-formaldehyde resin, and the resin coating then dried to a tacky condition by air nozzles 26. Each side of the sheet aluminum 22 is then covered with paper sheeting 10 and 12 and firmly pressed together by nip rolls 28. The resultant sub-assembly 27 can then be dried by passage through a heated chamber wherein the temperature can be controlled either merely to dry the sub-assembly, or to be high enough to heat-cure the resin to the "B" stage thereby minimizing further flow of resin when heated for conversion to the "C" stage in the subsequent laminating operation. Thereafter the sub-assembly 27 is impregnated with more of the same resin solution by being passed through a second dipping tank 34, and then dried by passage through a second drying chamber 36 to a volatile content of about 3.0 per cent or less (as determined by heating a sample for 5 minutes at 160° C.). A temperature below that causing heat-curing of the resin is maintained in this chamber 36 since this last coating must have some flow when heated to enable bonding to take place with superimposed fibrous sheets which have not been treated with resin.

The typical wood furniture laminate illustrated in Fig. 4 was prepared by stacking in a heated press an assembly of plies consisting in the order named, of a back veneer sheet 40 of gum wood, a cross-band 41 of aspen, a core 42 of maple, another cross-band of aspen 43, a sub-assembly 27 of the improved resin impregnated paper and aluminum foil, and a face veneer 45 of mahogany. As adhesives to form bonds between the back 40, the cross-band 41, the core 42, and the other cross-band 43 there can be used the alcohol reacted thermosetting phenol-formaldehyde resins herein disclosed or any of the conventional thermosetting resins hitherto employed in conventional plywood manufacture, such as phenol-formaldehyde resins, melamine-formaldehyde resins and urea-formaldehyde resins. This assembly was consolidated into a solid unitary panel by being subjected to a pressure of 300 pounds per square inch for 10 minutes between press platens maintained at a temperature of 145° C. The mahogany veneer surface was then coated with a heat-resistant coating, such as a thermosetting alkyd resin, a urea-formaldehyde resin, phenol-formaldehyde baking lacquer or an oleo-resinous varnish.

The Douglas fir plywood structure illustrated in Fig. 5 comprises 3 plies 50, 51 and 52 of fir bonded together by means of two sub-assemblies 27 of sheet aluminum having on each face an adherent sheet of paper impregnated with alcohol reacted phenol-formaldehyde resin. In this instance the resin content of the aluminum sub-assemblies 27 supplies all the bonding agent required for the laminate structure. Laminates of this type are useful as moisture barriers and insulating material for the inner walls of prefabricated houses, commercial refrigerators, and refrigeration railroad cars, and air conditioning installations. With this type of construction it is advisable to dry the veneer plies to a relatively low moisture content, four per cent or less, to avoid excessive steam formation during the laminating operation which may cause blowing up of the panel at the resin glue line because of interference to venting by the aluminum sheet.

The thermosetting phenol-formaldehyde resins of particular utility in the practice of the present invention are prepared by condensing between 1.2 and 2.5 mols of formaldehyde or its polymers such as paraform with a mol of phenol or a mol of phenol in admixture with minor amounts of alkyl or aryl monohydric phenols having two or more reactive nuclear positions available for chaining or cross-linking by methylene groups derived from formaldehyde, and free from reactive groups other than the phenolic hydroxyl. The condensation reaction preferably is maintained at pH between 8 and 9.5 by having present in catalytic amounts, a strong fixed alkali such as sodium hydroxide, barium hydroxide, sodium sulphite, sodium carbonate and the like. Organic alkaline catalysts effective in maintaining a pH of at least 8.0 can also be employed, for example, triethanolamine. A reaction pH higher than 9.5 may be used providing the final resin before use is neutralized with acid to a pH below 9.5 since resins of higher alkalinity tend to corrode aluminum.

Upon the formation of a fusible water-insoluble resin, the reaction mixture is substantially dehydrated under conditions known to those skilled in the art for avoiding gelation of the resin. Removal of about 90 per cent of the water present as such in the formalin solution is sufficient at this stage. The dehydrated resin is further reacted to a fusible product of higher molecular weight by dissolving the resin in up to about an equal amount by weight of a saturated lower aliphatic monohydric alcohol having from two to five carbon atoms in the molecule (e. g. ethyl alcohol, isopropyl alcohol, iso butyl alcohol, and n-amyl alcohol) and heating the solution to temperatures as high as the refluxing temperature at atmospheric pressure. The reaction in alcoholic solvent is continued until a 1.5 gram sample of the resin solution when placed in a ⅜ inch by 3 inch glass test tube suspended in an oil bath at 121° C. yields a gelled mass in a time period between 30 and 180 seconds. The resin alcohol solution is then cooled to room temperature, and if at a pH higher than 9.5 it is neutralized to a pH between 8 and 9.5 with dilute hydrochloric acid. The solution at such temperature and pH range is stable for at least one month, and often up to 5 months.

The reaction in alcoholic solvent is a controlling factor in producing resins characterized by rapid gelation at the moderate temperature of 121° C., but yet having reasonably low viscosities when dissolved in alcoholic solvents for coating and impregnation purposes. On the other hand, similar resins not reacted in the presence of alcohol, but having the same gelation speed, yield alcohol solutions at 30 to 50 per cent resin content which are too viscous for satisfactory coating of aluminum or impregnation of cellulosic material. The inhibiting effect of the alcohol is also observed in the prolonged reaction required to attain the desired gelation speed, for example equal parts by weight of alcohol and dehydrated resin may require several days of reaction at refluxing temperatures before the resin exhibits a gelation speed of 180 seconds or less at 121° C., whereas by adding the alcohol in increments of about one part per 10 parts resin solids and refluxing after each increment until the viscosity has increased considerably, the resin can be made to the desired gelation end point in 10 to 20 hours.

Somewhat higher specific adhesion and bond strengths are obtained by condensing the formaldehyde with a mixture of phenol and substituted phenols instead of phenol exclusively. The phenol mixture comprises at least 60 per cent by weight of phenol with the balance being mono-alkyl or mono-aryl substituted monohydric phenols having at least two reactive nuclear positions. Exemplary of the aforedescribed class of substituted phenols are ortho-, meta-, or para-cresols and xylenols, ortho- and para-tertiary butyl phenols, the isomeric amyl phenols and octyl phenols, and ortho-, para-, and meta-phenyl phenols. As sub-minor amounts in such phenol mixtures there can be present up to about 5 per cent by weight of the mixture, the dialkyl or trialkyl monohydric phenols which are normally formed as by-products in the alkylation reaction for making mono-alkyl phenols. These polysubstituted phenols and their condensation products with formaldehyde in the instance of those having at least one reactive nuclear position appear to function as permanent in-situ plasticizers for the thermosetting resin after heat-curing, and yet do not unfavorably increase the flow of the resin during heat-curing.

Alternatively any of the aforedescribed thermosetting resins can be modified by the incorporation of minor amounts of polyvinyl acetate but not exceeding about 15 per cent by weight of the phenolic resin, since the effect of higher amounts is to decrease the cured resins resistance to boiling water. The polyvinyl acetate appears to act as a compatible permanent plasticizer, promoting specific adhesion to sheet aluminum without objectionably increasing the flow of the thermosetting resin into the fibrous structure of the laminate or impairing the phenolic resin's thermoset qualities of infusibility and insolubility in water and various organic solvents. Maximum bond strengths have been obtained with the polyvinyl acetal present in amount between 4 and 8 per cent.

The invention is further illustrated by the following examples, all parts being by weight.

EXAMPLE 1

A resin still was charged with 100 parts formalin (37 per cent formaldehyde content) 74.5 parts phenol, 25.5 parts of a phenolic mixture consisting of 2.5 per cent ortho tertiary butyl phenol, 67.81 per cent para tertiary butyl phenol, 12.95 per cent tertiary dibutyl phenol, 4.23 per cent of tertiary tributyl phenol and 12.51 per cent of phenol, and as alkaline catalyst 4.0 parts sodium sulphite. The reaction mixture was heated to reflux temperatures (100°–104° C.) at atmospheric pressure for 40 minutes, forming a liquid resin. The resin was dehydrated by heating under sub-atmospheric pressure until about 56 parts of water had distilled off. Then 20 parts of ethyl alcohol were added to the dehydrated resin, and the resultant solution heated to a refluxing temperature at atmospheric pressure of about 95° C. and held at this temperature for several hours until the resin solution had a viscosity between 2,000 and 3,000 centistokes at 25° C. Then another 20 part increment of alcohol was added to the reaction mass, and refluxing was continued at about 87° C. until a sample of the resin solution adjusted to 50 per cent resin solids with alcohol had reached a viscosity between 150 to 200 centistokes at 25° C. Another increment of alcohol amounting to 60 parts was then added and refluxing continued at about 75° C. until a test sample of the resin solution exhibited a gelation speed of about 100 seconds at 121° C. The resin solution was then cooled to room temperature; the solution contained 48 to 50 per cent resin solids as determined by heating a 1 to 2 gram sample in an open container for three hours at 135° C. The resin solution at this solids content had a viscosity of 400 centistokes at 25° C. To this solution there were added 16 parts of a 70 per cent solution in acetone of polyvinyl acetate having an average molecular weight of about 4,000. The mixed resin solution was then diluted by adding to 100 parts thereof, 59 parts of ethyl alcohol and 7 parts of water which promotes the penetration of the resin solution into the paper fibers.

Aluminum foil of 0.0015 inch thickness and cleaned to a grease free condition by washing with an aqueous solution of trisodium phosphate was roller coated on both sides with the mixed resin solution in an amount providing 1.0 to 2.0 pounds of dry resin per 1,000 square feet of single surface area. The coating was dried to a tacky condition by air blown thereover, and then sheets of 8-pound per ream tissue paper were roller pressed against each side of the aluminum foil. The assembly of tissue paper and aluminum foil was dried for 10 minutes in an oven at 60° C. After drying, each paper covered surface of the assembly was recoated with the same resin solution, but in amount providing 3 to 4 pounds of resin solids per 1,000 square feet of single surface. The second coating was dried for 10 minutes at 60° C., yielding a non-tacky surface permitting the paper covered aluminum foil assembly to be rolled upon itself for storage convenience without sticking together.

To test the peel strength of plywood bonded with the paper covered aluminum assembly according to ASTM test method "D–903–46–T," 1 inch x 8 inch strips of mahogany-faced plywood were heat and pressure bonded to 1 inch x 12 strips of the resin containing tissue paper covered aluminum sub-assembly (Example 1) at a press temperature of 140° C. and a pressure of 250 pounds per square inch for 10 minutes. The peel strength is the average load per unit width of bond line required to separate progressively one member from the other over the adhered strength surfaces at a separation angle of approximately 180 degrees and at a separation rate of 6 inches per minute, the results being expressed in pounds per inch of width. The peel strengths of bonded plywood assemblies thus made were tested dry and also on wet samples which had been boiled in water for 4 hours. The dry samples had an average peel strength of 7–10 pounds per inch width, and the wet samples about 1–3 pounds per inch width.

Shear strengths obtainable in two-ply wood veneer construction with the sub-assembly of paper and aluminum foil prepared in Example 1 were determined on samples of birch plywood. The plywood was made by inserting between two sheets of birch veneer (with parallel grain) the sub-assembly 27 of resin-containing tissue paper mounted aluminum foil and then bonding all the plies together under the same conditions described for the samples used in the peel strength tests. The average shear strength of test samples thus made was 500–750 pounds per square inch. Samples which had been boiled in water for four hours and then tested had an average shear strength between 250 and 400 pounds per square inch.

Resin-containing aluminum foil sub-assemblies prepared with papers of greater thickness yielded plywood structures of lower bonded strength than the lightweight tissue paper previously described. The test results for different papers are set forth in Table I, the data being based on samples prepared and tested in the same manner. There is also included data on plywood assemblies made with aluminum foil merely coated with the resin solution of Example I and used as such for the bonding element.

Table I

| Type of Paper | Average Peel Strength, Pounds per Inch Width (dry samples) | Average Shear Strength, Pounds per Square Inch | |
|---|---|---|---|
| | | (dry samples) | (wet samples) |
| 8 pound tissue | 7.5 | 605 | 387 |
| 15 pound tissue | 2.6 | 565 | 270 |
| 30 pound Southern Kraft | 2.1 | 554 | 244 |
| Aluminum foil coated with resin only | 1.6 | 533 | 146 |

EXAMPLE 2

The effect of varying the percentage composition of phenol to the phenolic mixture of butyl phenols described in Example 1, was determined by preparing a series of six resins, herein identified as Examples 2a to 2f inclusive. In these examples the butyl phenol mixture content varied from 0 to 50 per cent by weight of the total phenol content. The resins were otherwise prepared and reacted with the same amount of formaldehyde and to substantially the same gelation end point described in Example 1, and then mixed with the same amount of polyvinyl acetate. Clean, grease-free aluminum foil of 0.0015 inch thickness was coated with the resins, and 8 pound tissue paper then mounted on the resin coated surfaces to form sub-assemblies which were used as the bonding element between two plies of birch wood. The plywood veneers thus made were tested for shear strength using dry and wet samples as described before. The test results set forth in Table II indicate definitely from the percentage amount of wood failure (percent W. F.) observed after shearing of the dry samples, that the presence of some substituted phenol or polyvinyl acetate improves the bond strength in comparison with a resin made from phenol exclusively or containing no polyvinyl acetate.

Table II

| Example No. | Resin Formula | | | Shear Strength, Pounds per Square Inch | | | |
| --- | --- | --- | --- | --- | --- | --- | --- |
| | Formalin (37%) | Parts Phenol | Parts Butyl Phenol Mixture | Dry | Percent W.F. | Wet | Percent W.F. |
| 2a* | 100 | 100 | 0 | 488 | 36 | 256 | 0 |
| 2b | 100 | 100 | 0 | 476 | 88 | 334 | 0 |
| 2c | 100 | 85 | 15 | 496 | 92 | 290 | 0 |
| 2d | 100 | 75 | 25 | 544 | 96 | 324 | 0 |
| 2e | 100 | 60 | 40 | 468 | 80 | 300 | 0 |
| 2f | 100 | 50 | 50 | 574 | 72 | 266 | 0 |

The resin formula identified with the asterisk was not modified with polyvinyl acetate and it showed the lowest percentage of wood failure in the sheer strength tests.

EXAMPLE 3

A series of four thermosetting resins identified hereinafter as Examples 3a, 3b, 3c, and 3d were prepared in substantially the same manner as described in Example 1. In each case, 100 parts of formalin were reacted with a mixture consisting of 80 parts of phenol and 20 parts of a substituted phenol. The resins so obtained were used as adhesives for preparing tissue paper covered aluminum foil sub-assemblies, and these assemblies were then used as the bonding element for two-ply birch wood veneers according to the procedure described in Example 1. In Table III the sheer strengths obtained with two-ply birch veneers containing the various resins are tabulated, together with the same amount of wood-failure (percent W. F.) observed for the dry samples after shearing.

Table III

| Example No. | Resin Formula | | | Shear Strength, Pounds per Square Inch | | | |
| --- | --- | --- | --- | --- | --- | --- | --- |
| | Parts Formalin (37%) | Parts Phenol | Parts Substituted Phenol | Dry | Percent W.F. | Wet | Percent W.F. |
| 3a | 100 | 80 | 20 cresol mixture.* | 570 | 86 | 387 | 0 |
| 3b | 100 | 80 | 20 paraamyl phenol. | 616 | 63 | 364 | 0 |
| 3c | 100 | 80 | 20 paraphenyl phenol. | 608 | 84 | 393 | 0 |
| 3d | 100 | 80 | 20 paraoctyl phenol. | 631 | 56 | 356 | 0 |

* Commercial cresol mixture containing meta-, para- and ortho cresols, up to 10% phenol and up to 15% xylenols.

The data set forth in Tables I, II, and III demonstrate that the bonds of the laminated structures prepared in accordance with the present invention are highly resistant to the effects of boiling water. In comparison, bonds between wood to wood obtained with commercial thermosetting urea-formaldehyde resins tend to delaminate after less than one half hour immersion in boiling water.

Resistance to alternate cycles of heat and cold of laminated plywood bonded with the herein described resin coated sub-assembly of aluminum foil and paper was determined by alternately heating the plywood to 49° C. for one hour and then chilling the plywood to −15° C. for one hour. After 25 complete cycles, no delamination was observed. The same resistance to delamination was noted in panels exposed alternately to humid and dry air for four weeks. The cycle was on the order of one week at 32° C. with 90 per cent relative humidity and three days at 43° C. in dry air, repeated several times.

In addition to the hot-press method for bonding plywood with the resin containing paper covered aluminum sub-assemblies, the sub-assemblies can be adapted for cold press work. For this type of work the sub-assemblies are precured under heat and pressure until the resin is infusible. The cured sub-assemblies are then inserted between sheets of wood veneer coated with a room temperature hardening acid catalyzed urea-formaldehyde resin. The assembly was then clamped together and held under clamping pressures between 50 and 300 pounds per square inch for 15 hours at 32° C. The dry shear strengths of the laminates thus made with gum veneer ranged between 520 and 680 pounds per square inch with wood failures between 70 and 100 per cent.

Burn-proof laminates consisting only of paper plies impregnated with a thermosetting resin, such as urea-formaldehyde, melamine-formaldehyde, phenol-formaldehyde and the like, can be made by inserting one or more sub-assemblies of the resin treated paper covered aluminum foil in the stack of paper plies, either as an intermediate ply adjacent to the top ply of paper or as the top or outer ply itself, and then consolidating the stack in the usual manner with heat and pressure.

Compreg or high density plywood constructions which are made by bonding together several plies of wood impregnated with thermosetting resins under pressure sufficient to compress the assembly to about 50 per cent of its original thickness and/or to about 50–70 per cent increase in specific gravity are normally highly resistant to moisture and heat due to the high resin content. In such instance the use of the sub-assembly of the resin containing paper covered sheet aluminum supplements this resistance without detracting from the overall strength of this type of plywood structure. The sheet aluminum can serve, however, as an electrical conductor or shielding means for radio frequency waves.

We claim:

1. A laminated structure comprising an assembly of fibrous cellulosic sheet material bonded to the paper surface of a sub-assembly of sheet aluminum at least one face thereof having a paper sheet adhesively secured thereto by a thermosetting phenol-formaldehyde resin reacted in the presence of a saturated lower aliphatic monohydric alcohol having from two to five carbon atoms in the molecule to a gelation speed between 30 and 180 seconds at 121° C.

2. A laminated structure comprising an assembly of fibrous cellulosic sheet material bonded to the paper surface of a sub-assembly of sheet aluminum at least one face thereof having a paper sheet adhesively secured thereto by an alcohol-reacted thermosetting resinous reaction product of between 1.2 and 2.5 mols formaldehyde and a molar quantity of phenol and a minor amount of a phenol selected from the class of alkyl phenols and phenyl phenols having at least two reactive nuclear positions, said reaction product having been reacted in the presence of a saturated lower aliphatic monohydric alcohol having from two to five carbon atoms in the molecule until the resin has a gelation speed between 30 and 180 seconds at 121° C.

3. A laminated structure comprising an assembly of fibrous cellulosic sheet material bonded to the paper surface of a sub-assembly of sheet aluminum at least one face thereof having a paper sheet adhesively secured thereto by an alcohol-reacted thermosetting phenol-formaldehyde resin having been reacted in the presence of a saturated lower aliphatic monohydric alcohol having from two to five carbon atoms in the molecule until the resin has a gelation speed between 30 and 180 seconds at 121° C. and in admixture with polyvinyl acetate in amount up to about 15 per cent of the weight of the phenolic resin.

4. A sub-assembly for use in bonding fibrous cellulosic materials, said sub-assembly comprising an aluminum sheet with tissue weight paper-covered surfaces, said paper being adhesively secured to the aluminum sheet with an alcohol-reacted thermosetting phenol-formaldehyde resin having been reacted in the presence of a saturated lower aliphatic monohydric alcohol having from two to five carbon atoms in the molecule until the resin has a gelation speed between 30 and 180 seconds at 121° C.

5. A sub-assembly for use in bonding fibrous cellulosic material, said sub-assembly comprising an aluminum sheet having paper sheeting adhesively secured to its surfaces by thermoset phenol-formaldehyde resin reacted to a gelation speed between 30 and 180 seconds at 121° C. in the presence of a saturated lower aliphatic alcohol having from two to five carbon atoms in the molecule, said paper containing additional thermosetting phenol-formaldehyde resin in fusible form enabling fibrous cellulosic material to adhere thereto when subjected to heat and pressure.

6. Method for preparing a paper-covered sheet aluminum sub-assembly useful in the manufacture of laminated fibrous structures, which comprises coating the sheet aluminum surface with a solvent solution of alcohol-reacted thermosetting phenol-formaldehyde resin having been reacted in the presence of a saturated lower aliphatic monohydric alcohol having from two to five carbon atoms in the molecule until the resin has a gelation speed between 30 and 180 seconds at 121° C., drying the coating to a tacky state, pressure applying paper onto the tacky coating, drying the assembly of paper and sheet aluminum at elevated temperatures to a substantially solvent-free condition, recoating the assembly with the same resin solution, and then drying the recoated assembly below the heat-hardening temperature of the resin.

7. Method of preparing a resin-containing paper-covered sheet aluminum sub-assembly useful as a bonding element in the construction of laminated fibrous cellulosic structures, which comprises bonding paper sheeting to grease-free aluminum sheet with a solvent solution of thermosetting phenol-formaldehyde resin reacted in the presence of a saturated aliphatic monohydric alcohol having from two to five carbon atoms in the molecule until the resin has a gelation speed at 121° C. between 30 and 180 seconds, and drying the resin bonded assembly of paper and aluminum to a non-tacky condition by heating the assembly to a moderate temperature below the resin's heat-curing temperature.

8. Method of producing plywood structures having a moisture barrier of sheet aluminum which comprises bonding paper sheeting to the sheet aluminum surface with a solvent solution of an alcohol-reacted thermosetting phenol-formaldehyde resin having been reacted in the presence of a saturated lower aliphatic monohydric alcohol having from two to five carbon atoms in the molecule until the resin has a gelation speed between 30 and 180 seconds at 121° C. to form a bonded sub-assembly of paper and sheet aluminum, drying the sub-assembly to a substantially solvent-free condition, inserting the sub-assembly between wood elements, and then bonding the entire assembly together by subjecting it to heat and pressure.

9. Method of producing a plywood structure having a moisture barrier of sheet aluminum which comprises bonding paper sheeting to sheet aluminum with a solvent solution of a thermosetting phenol-formaldehyde resin reacted to a gelation speed between 30 and 180 seconds at 121° C. in the presence of a saturated lower aliphatic alcohol having from two to five carbon atoms in the molecule to form a sub-assembly of the paper and a sheet aluminum, heat-curing the resinous binder to the "C" stage of infusibility and insolubility, inserting the cured sub-assembly between wood elements coated with a room temperature acid-hardening urea-formaldehyde resin, and subjecting the entire assembly to pressure until the urea-formaldehyde resin has hardened.

References Cited in the file of this patent

UNITED STATES PATENTS

| Number | Name | Date |
|---|---|---|
| 1,019,407 | Baekeland | Mar. 5, 1912 |
| 1,019,408 | Baekeland et al. | Mar. 5, 1912 |
| 1,887,691 | Loetscher | Nov. 15, 1932 |
| 1,921,164 | Lewis | Aug. 8, 1933 |
| 1,974,465 | Lewis | Sept. 25, 1934 |
| 2,117,085 | Ensminger | May 10, 1938 |
| 2,392,574 | Brown | Jan. 8, 1946 |
| 2,401,987 | Taylor | June 11, 1946 |
| 2,403,077 | Hershberger | July 2, 1946 |

FOREIGN PATENTS

| Number | Country | Date |
|---|---|---|
| 440,578 | Great Britain | Jan. 2, 1936 |

OTHER REFERENCES

"Vinylite Resins," pamphlet published by Bakelite Corp., New York, 1945, pages 6, 14.